United States Patent
Asa et al.

(10) Patent No.: US 7,250,017 B2
(45) Date of Patent: Jul. 31, 2007

(54) AUXILIARY MACHINE DRIVEN BY ENGINE AND MOTOR AND CAPABLE OF STARTING ENGINE

(75) Inventors: Hironori Asa, Okazaki (JP); Shigeki Iwanami, Okazaki (JP); Keiichi Uno, Kariya (JP); Hiroshi Ogawa, Nishio (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 199 days.

(21) Appl. No.: 11/184,691

(22) Filed: Jul. 19, 2005

(65) Prior Publication Data

US 2006/0019786 A1    Jan. 26, 2006

(30) Foreign Application Priority Data

Jul. 22, 2004    (JP)    .............................. 2004-214206

(51) Int. Cl.
*F16H 3/72*    (2006.01)

(52) U.S. Cl. .......................................................... 475/8

(58) Field of Classification Search .................... 475/8, 475/2, 5; 180/53–8; 417/214, 223, 326
See application file for complete search history.

(56) References Cited

U.S. PATENT DOCUMENTS

| 6,375,436 B1 | 4/2002 | Irie et al. |
| 6,845,832 B2 | 1/2005 | Takizawa et al. |

FOREIGN PATENT DOCUMENTS

| JP | 2000-130323 | 5/2000 |
| JP | 2003-220843 | 8/2003 |

*Primary Examiner*—Dirk Wright
(74) *Attorney, Agent, or Firm*—Haness, Dickey & Pierce, PLC

(57) ABSTRACT

An auxiliary machine driven by an engine comprises: an operating section operated by a rotary motion and having a drive shaft; an input shaft, one side of which is connected to the engine and the other side of which is connected to the operating section; a clutch for connecting the engine to the input shaft and for disconnecting the engine from the input shaft; an electric motor; a planetary gear mechanism arranged between the input shaft and the output shaft; a first rotary direction regulating means for inhibiting a rotary direction of the input shaft in one-direction; and a second rotary direction regulating means for inhibiting a rotary direction of the drive shaft.

6 Claims, 7 Drawing Sheets

ENGINE STARTING MODE
(ELECTROMAGNETIC CLUTCH ON)

BELT DRIVING MODE
(ELECTROMAGNETIC CLUTCH ON)

MOTOR DRIVING MODE
(ELECTROMAGNETIC CLUTCH OFF)

BELT DRIVING MODE
(ELECTROMAGNETIC CLUTCH ON)

MOTOR DRIVING MODE
(ELECTROMAGNETIC CLUTCH OFF)

ALIGNMENT CHART OF PLANETARY GEAR

AUXILIARY MACHINE DRIVEN BY ENGINE AND MOTOR AND CAPABLE OF STARTING ENGINE

BACKGROUND OF THE INVENTION

1. Field of the Invention

The present invention relates to an auxiliary machine mounted on a vehicle and driven by an engine.

2. Description of the Related Art

In the case of a hybrid compressor according to a conventional example, the compressor can be driven by an engine and a motor. The compressor is mainly driven by the engine at the time of running. At the time of idling stop, the compressor is driven by the motor. In this case, when the engine is started after an idling stop, it is necessary to use a conventional starter or a starter exclusively used for starting the engine after the idling stop, that is, restarting of the engine must be conducted by a conventional starter or a starter exclusively used for starting the engine after an idling stop. Using the conventional starter in this way is disadvantageous in that the life of the brushes becomes so short and, further, noise is generated at the time of starting the engine. Using a belt type starter, which is exclusively used for starting the engine after idling stop, is disadvantageous in that it takes a larger space to be installed and further the manufacturing cost of the hybrid compressor is raised.

Further, according to another conventional example, which is disclosed, for example, in Patent Document 2, power is divided by a planetary gear in the same manner as that of the above conventional example, and the arrangement is the same. In this structure, the components are connected to each other according to the corresponding relations described below. The sun gear connects to a motor, the ring gear connects to a compressor, and the planetary carrier connects to an engine shaft. However, the following problems may be encountered. Although the engine is driven by the motor, the planetary carrier is connected to the engine directly or to the converter. Therefore, it is impossible to drive the compressor by the motor alone while the vehicle is running.

[Patent Document 1] JP-A(Japanese Unexamined Patent Publication)-2000-130323

[Patent Document 2] JP-A-2003-220843

From the viewpoints of solving environmental problems and saving energy, a system, of driving an engine, has been recently employed in which the engine is stopped when the vehicle is temporarily stopped. This system is referred to as an idling stop system or an idling stop control. In the vehicle in which this idling stop control is employed, the compressor, which is arranged in the refrigerating cycle device driven by the engine, is also stopped when the engine is stopped, that is, the refrigerating cycle device does not function when the engine is stopped.

As a countermeasure for solving the above problems, a hybrid compressor is known in which the pulley for transmitting rotation of the engine is connected to the compressor via an electromagnetic clutch, and the rotary shaft, on the side opposite to the pulley, of the compressor is connected to the motor. This arrangement is disclosed, for example, in Patent Document 1. Due to the above arrangement, when the engine is stopped, the electromagnetic clutch is cut off, so that the compressor can be driven by the motor. Therefore, irrespective of the operation or the stoppage of the engine, the refrigerating cycle device can fulfill the function of cooling.

There is provided an example of the above hybrid compressor in which the compressor can be driven by either the engine or the motor and the compressor is mainly driven by the engine while the vehicle is running and the compressor is driven by the motor at the time of idling stop. Referring to FIGS. 6 to 8, the above hybrid compressor will be explained below. FIG. 6 is a lateral sectional view of the hybrid compressor 101 of the conventional example, and FIG. 7 is an enlarged sectional view showing a neighborhood of the second one-way clutch arranged between the motor 120 and the housing 140. The hybrid compressor 101 includes a housing 140 and an input shaft 111. One end portion of the input shaft 111 is connected to the hybrid compressor 101, and the other end of the input shaft 111 is connected to the engine via the pulley 110 and the belt. The housing 140 accommodates composing sections of the hybrid compressor 101. The housing 140 accommodates: a compression section 130 for compressing and discharging refrigerant; a motor 120 capable of rotatably driving the compression section 130; a planetary gear 150, one side of which is connected to the input shaft 111 and the other side of which is connected to the compression section (operating section) 130; a first one-way clutch 180 for connecting the housing 140 with the input shaft 111 and for disconnecting the housing 140 from the input shaft 111; a second one-way clutch 190 for connecting the housing 140 with the motor 120 and for disconnecting the housing 140 from the motor 120; and an electromagnetic clutch 170 for connecting the engine side with the hybrid compressor 101 and for disconnecting the engine side from the hybrid compressor 101.

At the time of a normal operation, the compression section 130 of the hybrid compressor 101 is driven by the engine. In this case, the electromagnetic clutch 170 is turned on, that is, the electromagnetic clutch 170 is connected, and the first one-way clutch 180 allows the rotation of the input shaft 111. At this time, as the second one-way clutch 190 regulates the rotation, the motor 120 is fixed to the housing 140. In this state, the compression section 130 is driven by the engine via the planetary gear 150. The belt driving mode in this case is shown in FIG. 8.

In another state of the hybrid compressor 101, the hybrid compressor 101 can be operated in such a manner that the compression section 130 is rotatably driven by the motor 120. This is a case in which the hybrid compressor 101 is operated under a condition in which the engine is not operated, for example idling stop condition. In this case, the motor 120 is rotated in the direction in which the second one-way clutch 190 allows the motor 120 to rotate, and the rotation of the motor 120 is transmitted to the compression section 130 via the planetary gear 150, so that the hybrid compressor 101 can be operated.

SUMMARY OF THE INVENTION

The present invention has been accomplished in view of the above circumstances. It is an object of the present invention to provide an auxiliary machine capable of starting an engine after idling stop and also capable of being driven by a motor irrespective of ON/OFF of the engine.

It is another object of the present invention to provide a hybrid compressor capable of being driven by an engine and further a motor and, furthermore, capable of starting the engine by the motor.

It is still another object of the present invention to provide a hybrid compressor capable of being driven by an engine and a motor and, furthermore, capable of restarting the engine by the motor after idling stop.

According to a first aspect of the present invention, in order to accomplish the above objects, an auxiliary machine driven by an engine mounted on a vehicle comprises: a housing; an operating section operated by a rotary motion and having a drive shaft; an input shaft, one side of which is connected to the engine and the other side of which is connected to the operating section; a clutch for connecting the engine to the input shaft and for disconnecting the engine from the input shaft; an electric motor; a planetary gear mechanism; a first rotary direction regulating means for inhibiting one of rotary directions of the input shaft; and a second rotary direction regulating means for inhibiting a rotary direction of the drive shaft.

When the auxiliary machine is composed as described above, in order to start an engine in a vehicle after idling stop, the engine can be driven by a belt. Therefore, it is possible to reduce the noise at the time of starting the engine. Further, at the time of running, the compressor can be driven by an electric motor.

In the present invention, when necessary, the compressor capacity can be made variable by changing the motor speed.

In a second aspect of the present invention according to the first aspect, both the first rotary direction regulating means and the second rotary direction regulating means are one-way clutches.

According to this aspect, the first rotary direction regulating means and the second rotary direction regulating means are clarified, and a more specific configuration of the present invention can be disclosed.

In a third aspect of the present invention according to the first or the second aspect, the planetary gear mechanism is arranged between the input shaft and the operating section, a sun gear of the planetary gear mechanism is connected to the electric motor, a ring gear of the planetary gear mechanism is connected to the operating section, and planetary gears of the planetary gear mechanism are connected to the input shaft.

According to this aspect, the structure of the planetary gear mechanism is clarified, and a more specific configuration of the present invention is disclosed.

In a fourth aspect of the present invention according to any one of the first to the third aspects, in which the auxiliary machine is a compressor used for an air conditioner for vehicle use. This aspect clarifies the auxiliary machine.

In a fifth aspect of the present invention according to any one of the first to the fourth aspects, in which the electric motor is capable of driving the engine via the input shaft and also capable of driving the operating section via the drive shaft.

According to this aspect, it is made clear that the electric motor can drive both the engine and the operating section.

In a sixth aspect of the present invention according to any one of the first to the fifth aspects, the first rotary direction regulating means is arranged between the input shaft and the housing, and the second rotary direction regulating means is arranged between the drive shaft and the housing.

According to this aspect, positions at which the first rotary direction regulating means and the second rotary direction regulating means are arranged are clarified. Therefore, this aspect discloses a more specific configuration of the present invention.

The present invention may be more fully understood from the description of the preferred embodiments of the invention set forth below, together with the accompanying drawings.

DESCRIPTION OF THE PREFERRED EMBODIMENTS

Figure 1:
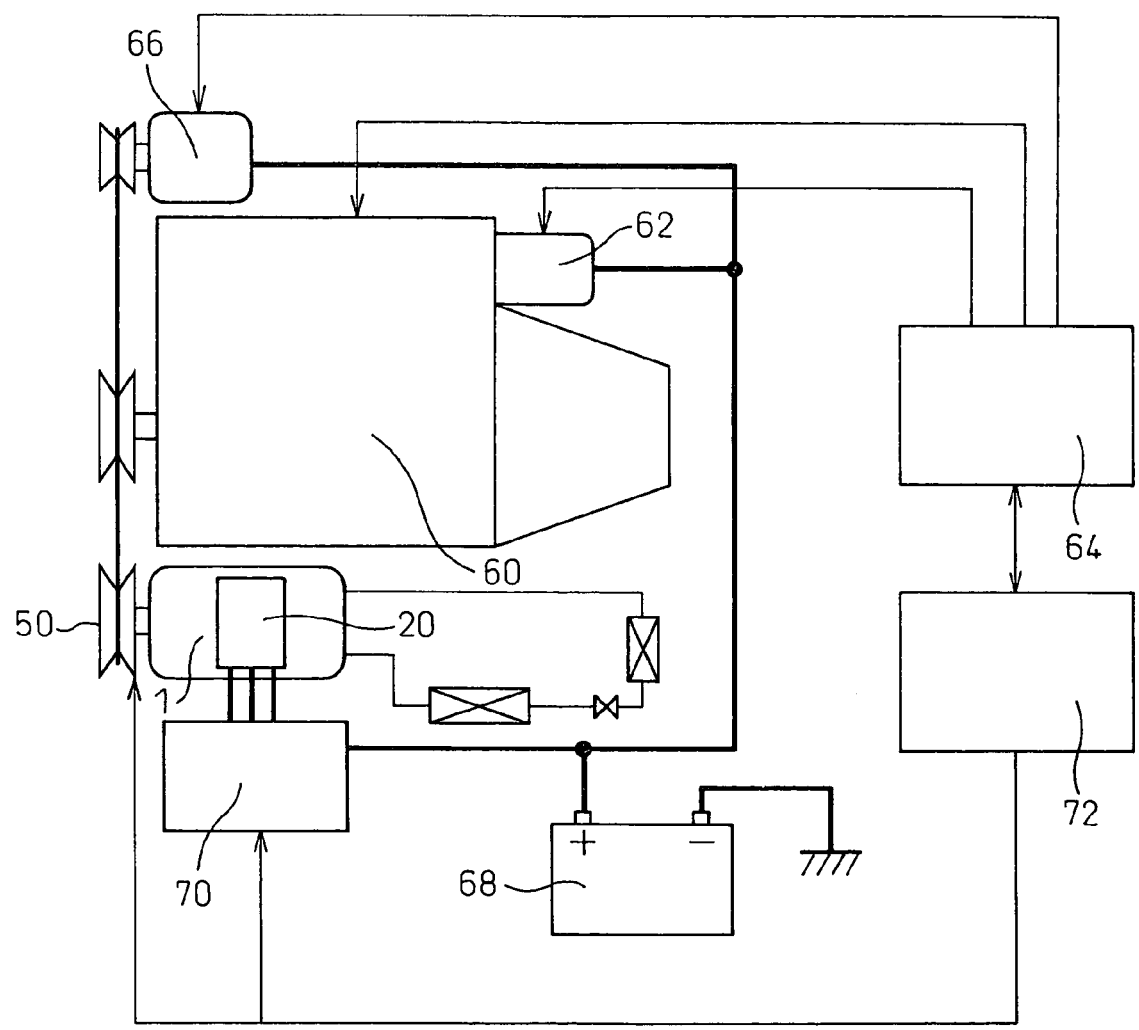
FIG. 1 is a block diagram showing an engine system of an embodiment of the present invention.
Figure 2:
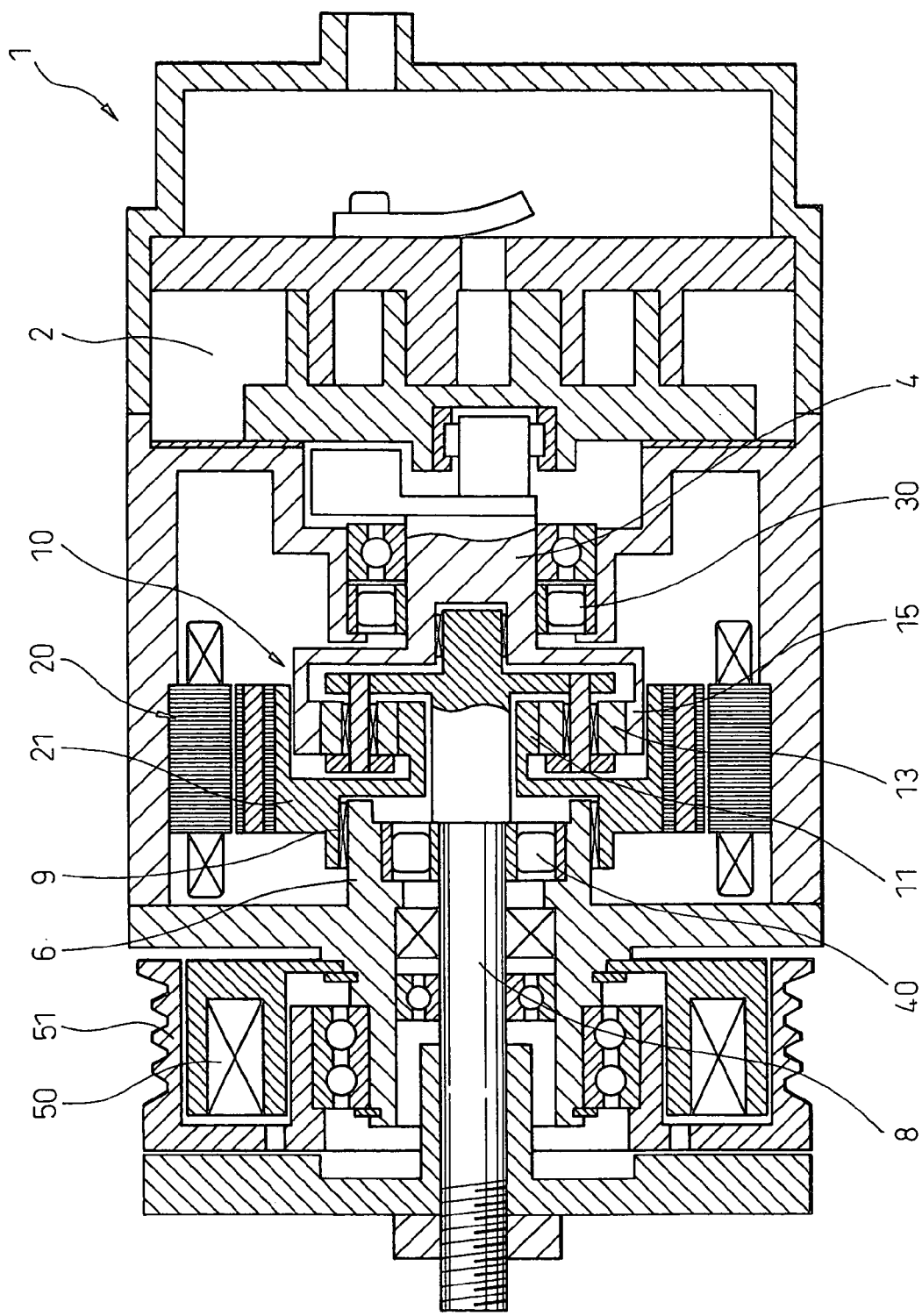
FIG. 2 is a sectional view showing a hybrid compressor of an embodiment of the present invention.
Figure 3:
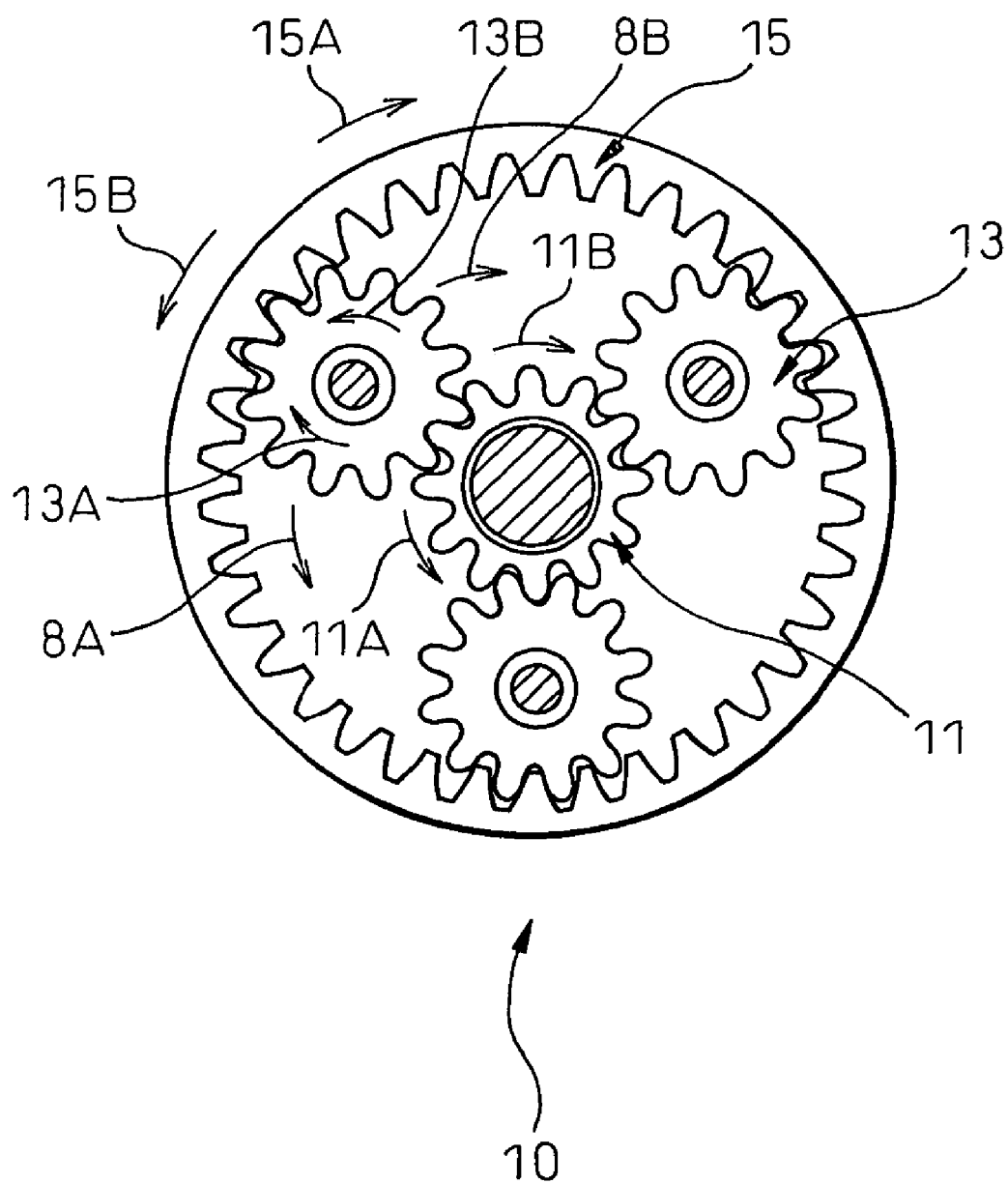
FIG. 3 is a front view showing a planetary gear mechanism.

Referring to the drawings, an embodiment of the present invention will be explained in detail as follows. FIG. 1 is a block diagram showing an engine system of a vehicle on which a hybrid compressor, which is an auxiliary machine to which the present invention is applied, is mounted. FIG. 2 is a sectional view schematically showing an embodiment of the hybrid compressor. FIG. 3 is a plan view showing a planetary gear mechanism. The hybrid compressor 1, which is explained in the embodiment, is a compressor incorporated into an air conditioner for automobile use.

Referring to FIG. 1, the engine 60 is a power source, of a vehicle, for driving the wheels. The engine 60 includes a starter motor 62 used for starting the engine. In this case, the engine 60 may be an internal combustion engine, such as a spark ignition type gasoline engine or a compression ignition type diesel engine. The engine 60 includes an ignition device or a fuel injection device, the starting and stopping of which can be controlled. These devices are controlled by the engine control unit 64. When a predetermined condition is detected, the engine control unit 64 executes an idling stop controlling operation. For example, the engine control unit 64 stops the engine 60 by interrupting the ignition or the fuel injection. The engine 60 drives an alternator 66, which is a generator, via a well known belt drive mechanism. The alternator 66 electrically charges the battery 68. An intensity of electric power generated by the alternator 66 is adjusted by the engine control unit 64. The starter 62 is supplied with electricity from the battery 68 and generates a relatively high torque. Therefore, the starter 62 is mainly used for starting the engine 60 when the temperature of the engine 60 is low. The battery 68 feeds electricity to the motor of the hybrid compressor 1 via the inverter 70. The hybrid compressor 1 is connected to the engine 60 via a belt. The inverter 70 drives the motor of the hybrid compressor 1 by supplying three-phase electric power. The electromagnetic clutch 50 and the motor 20 of the hybrid compressor 1 are controlled by the compressor control unit 72. The compressor control unit 72 controls the motor 20 via the inverter 70. The compressor control unit 72 is connected to the engine control unit 64 via a communication device and sends and receives signals. In this embodiment, the engine control unit 64 selects between the start of the engine 60 by the starter motor 62 and the start of the engine 60 by the hybrid compressor 1. For example, when the temperature of the engine 60 is low, the starter 62 is selected. When the engine 60 has been already warmed up, for example, when the engine 60 is restarted after the completion of idling stop, the hybrid compressor 1 is selected. It is possible for the engine control unit 64 to select a mode in which both the starter 62 and the hybrid compressor 1 are operated. In order to smoothly start the engine 60 according to the state of the engine 60, one of the starter 62 and the hybrid compressor 1 is selected. The hybrid compressor 1 is one component of the refrigerating cycle of the air conditioner for vehicle use. The hybrid compressor 1 sucks the refrigerant and discharges it after compression. Many of the refrigerating cycle devices are provided with an outdoor heat exchanger and an indoor heat exchanger, and cooling or heating is conducted through the indoor heat exchanger.

The hybrid compressor 1 of this embodiment includes a housing 6 and an input shaft 8. One end portion of the input shaft 8 is connected to the compressor 1 and the other end portion of the input shaft 8 is connected to an engine via the pulley 51. The housing 6 accommodates composing sections of the hybrid compressor 1 therein. The housing 6 accommodates: a compression section 2 for compressing and discharging refrigerant (which is the operating section in claims); a motor 20 capable of rotatably driving the compression section 2 and the engine; a planetary gear mechanism 10, one side of which is connected to the input shaft 8 and the other side of which is connected to the compression section 2; a first one-way clutch 40 for connecting the housing 6 with the input shaft 8 and for disconnecting the housing 6 from the input shaft 8; a second one-way clutch 30 for connecting the housing 6 with the drive shaft 4 and for disconnecting the housing 6 from the drive shaft 4; and an electromagnetic clutch 50 for connecting the engine side with the hybrid compressor 1 and for disconnecting the engine side from the hybrid compressor 1.

As shown in FIGS. 2 and 3, the planetary gear mechanism 10 includes a sun gear 11, a planetary gears 13 and a ring gear 15. As can be seen in the sectional view of FIG. 2, the sun gear 11 is integrated with the motor rotor 21 into one body, and the planetary gears 13 are connected to the input shaft 8. The sun gear 11 and the motor rotor 21 are pivotally supported by the bearing 9 with respect to the housing 6. On the other hand, the ring gear 15 is connected to the drive shaft 4 of the compression section 2. The first one-way clutch 40 is arranged between the input shaft 8 and the housing 6 and inhibits the rotation of the input shaft 8 in one direction and allows the rotation of the input shaft 8 in the other direction. Further, in this embodiment, the second one-way clutch 30 is arranged between the drive shaft 4 of the compression section 2 and the housing 6 and inhibits the rotation of the drive shaft 4 in one direction and allows the rotation of the drive shaft 4 in the other direction.

Due to the above constitution, first of all, in the first case, for example, when the engine is driven by the motor 20 via the input shaft 8 at the time of starting the engine, the first one-way clutch 40 operates under the condition that the electromagnetic clutch 50 is connected so that the rotation of the input shaft 40 can be allowed. Accordingly, the rotation in the normal direction of the motor 20 is transmitted to the planetary gears 13, which are rotated in the direction 13A, via the motor rotor 21 and the sun gear 11 rotated in the direction 11A of the sun gear 11. At this time, as the ring gear 15 is fixed to the housing 6 via the second one-way clutch 30 (the rotation of the ring gear 15 in the direction 15A inhibits the rotation of the second one-way clutch 30), the ring gear 15 does not rotate and the planetary gears 13 revolve in the direction 8A while it rotates in the ring gear 15. Accordingly, the compression section 2 does not rotate. Therefore, the compression section 2 does not operate. On the other hand, the revolution of the planetary gears 13 in the direction 8A rotatably drives the input shaft 8 in the direction 8A so that the engine can be driven. Although the motor 20 drives the engine in this way, the compression section 2 is not rotated, that is, the compression section 2 is not operated.

In the second case, when the compression section 2 is rotatably driven by the motor 20, as the motor 20 rotates in the direction reverse to that of the above case, the rotation of the motor 20 transmitted to the input shaft 8 via the sun gear 11, which is rotated in the direction 11B, and the planetary gears 13, which are rotated in the direction 13B, are directed in the direction so that the rotation of the input shaft 8 of the first one-way clutch 40 can be inhibited. Therefore, the input shaft 8 does not rotate. On the other hand, the rotation of the motor 20 is transmitted to the ring gear 15 via the sun gear 11 and via the planetary gears 13 and further transmitted to the drive shaft 4. The rotation in this direction (the rotation of the ring gear 15 in the direction 15B) is not inhibited by the second one-way clutch 30 but allowed. Therefore, the drive shaft 4 can rotate to rotatably drive the compression section 2. In this way, the motor 20 rotatably drives the compression section 2, so that the compression section 2 can be operated. As the auxiliary machine includes the planetary gear mechanism 10, the first one-way clutch 40 and the second one-way clutch 30 as explained above, the motor 20 is capable of rotatably driving the engine. At the same time, the motor 20 is capable of rotatably driving the compressor having the compression section 2. At this time, the electromagnetic clutch 50 is cut off, and the engine and the input shaft 8 may be disconnected from each other.

In the third case, for example, at the time of normal operation of the vehicle, when the motor 20 is rotated by the rotation of the engine, the motor 20 is capable of functioning as a generator. In this case, the rotary direction of the input shaft 8 is the same direction 8A as in the first case. In this case, in the same manner as that of the first case, the first one-way clutch 40 does not inhibit the rotation in this direction. The rotation of the input shaft 8 revolves the planetary gears 13 in the direction 8A, rotates the planetary gears 13 in the direction of 13A and further rotates the sun gear 11 in the direction 11A so that the motor rotor 21 is rotatably driven. Due to the foregoing, the motor 20 is made to function as a generator. On the other hand, this rotation of the engine is transmitted to the ring gear 15 via the revolution of the planetary gears 13, and the ring gear 15 is rotated in a direction reverse to the direction 15B. The reason is that the second one-way clutch 30 does not inhibit the rotation of the drive shaft 4 in this rotary direction. Accordingly, the compression section 2 is rotated, so that the compressor can be simultaneously operated.

In the case where the engine speed is low in the third case, in order to raise the rotary speed of the compression section 2, it is possible to raise the rotary speed of the compression section 2 by the motor 20. In this case, the motor 20 is reversely rotated, that is, the sun gear 11 is rotated in the direction 11B, and the planetary gears 13 are rotated in the direction 13B, so that the rotation speed of the ring gear 15 in the direction 15B can be increased. At this time, the planetary gears 13 are revolved in the direction 8A by the engine so that the ring gear 15 can be rotated in the direction 15B. Therefore, a drive force of the motor 20 is added to a drive force of the engine, so that the rotary speed of the compression section 2 can be raised. In this way, even when the engine speed is low, the rotary speed of the compressor can be maintained constant.

Figure 4A:
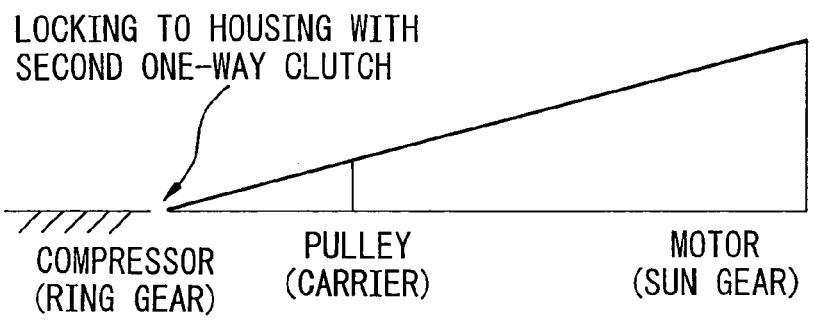
FIG. 4A is a graph showing a state of rotation operation in an engine starting mode.

Referring to FIGS. 4A to 4C and FIGS. 5A and 5B, the operation modes of the hybrid compressor of this embodiment will be explained below. FIG. 4A is a view showing an engine starting mode. As described before, in this engine starting mode, the planetary gears (carrier) 13 are revolved in the direction 8A by driving the motor 20 in the normal direction under the condition that the electromagnetic clutch 50 is turned on, that is, the electromagnetic clutch 50 is connected, so that the engine can be rotatably driven via the pulley 51. In this case, FIG. 4A shows a state in which the compression section 2, which is connected to the ring gear 15, is stopped by the action of the second one-way clutch 30.

Figure 4B:
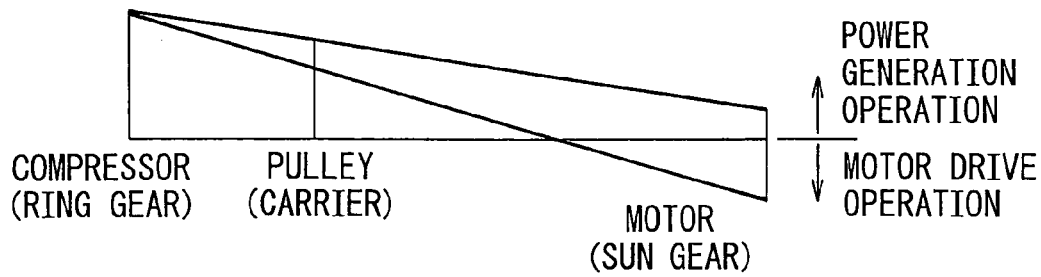
FIG. 4B is a graph showing a state of rotation operation in a belt driving mode.
Figure 5A:
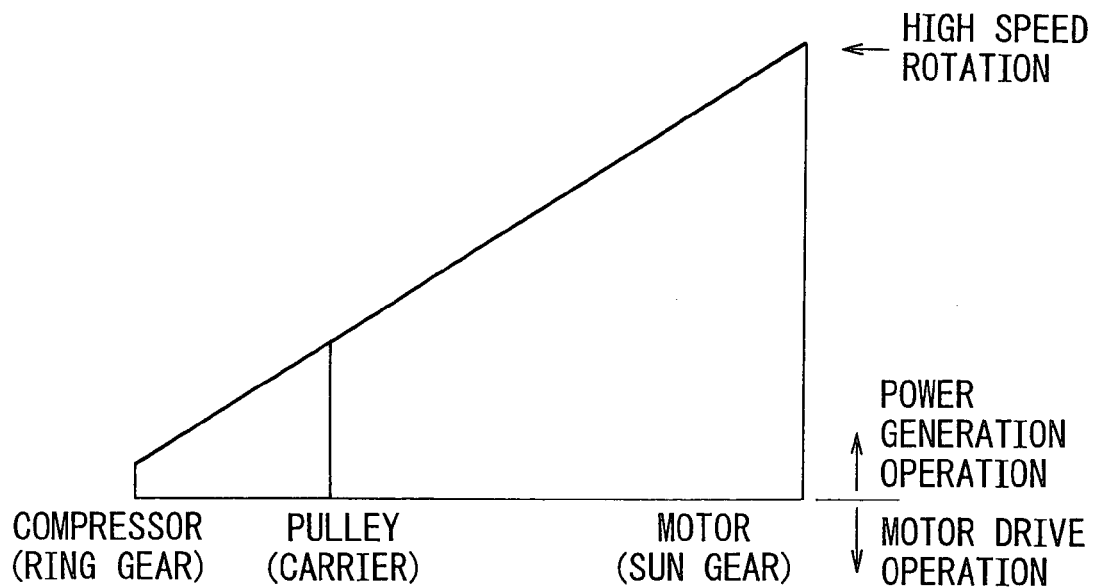
FIG. 5A is a graph showing a state of rotation operation in the belt driving mode.
Figure 5B:
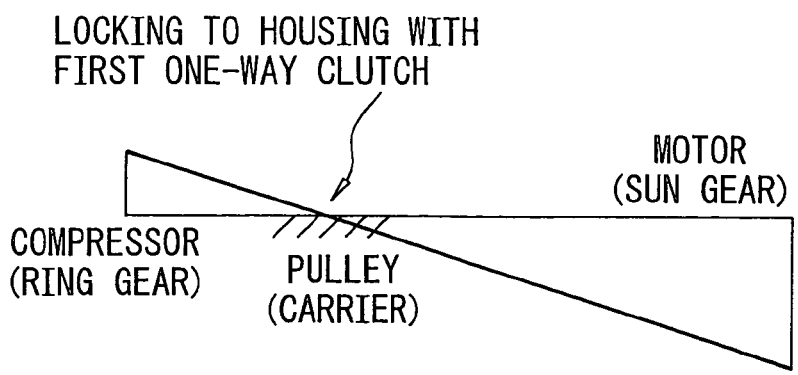
FIG. 5B is a graph showing a state of rotation operation in the motor driving mode.
Figure 6:
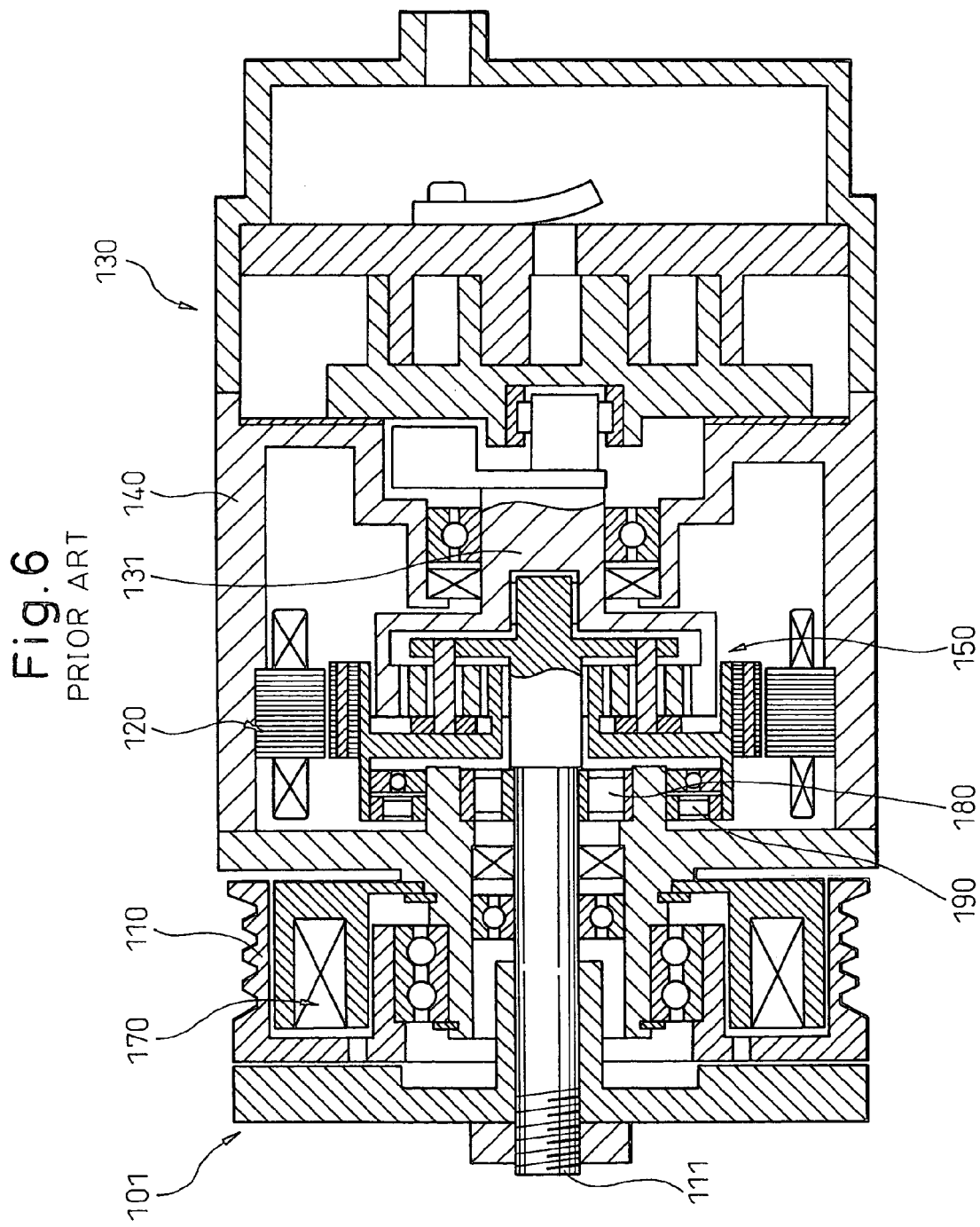
FIG. 6 is a sectional view showing a conventional hybrid compressor.
Figure 7:
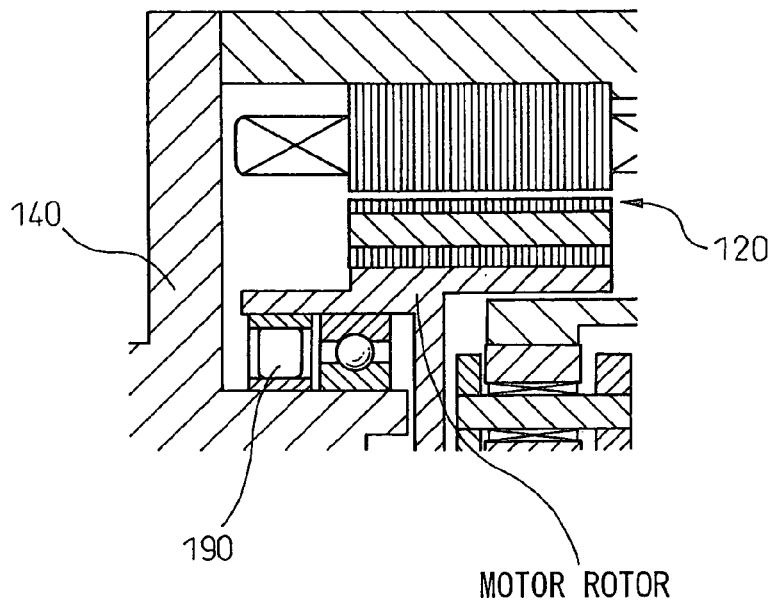
FIG. 7 is a partially enlarged view of the conventional hybrid compressor.
Figure 8:
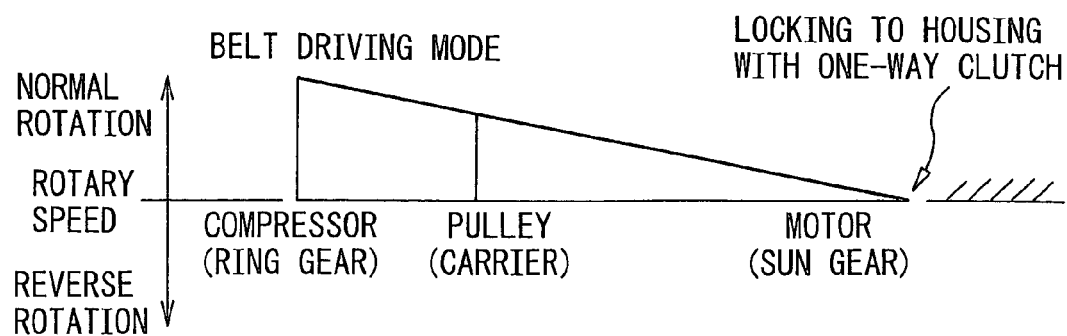
FIG. 8 is a graph showing a state of rotation operation in the conventional hybrid compressor.

FIG. 4B is a view showing a belt driving mode. As described before, in the belt driving mode, the motor 20 can be used as a generator by rotating the motor rotor 21 when the input shaft 8 is rotatably driven in the normal direction, that is, the direction 8A, by the engine via the pulley 51 under the condition that the electromagnetic clutch 50 is turned on, that is, the electromagnetic clutch 50 is connected. Alternatively, it is possible to operate the compression section 2 by rotating the ring gear 15 in the direction in which the second one-way clutch 30 does not inhibit the rotation. This state is shown in FIG. 5B.

Figure 4C:
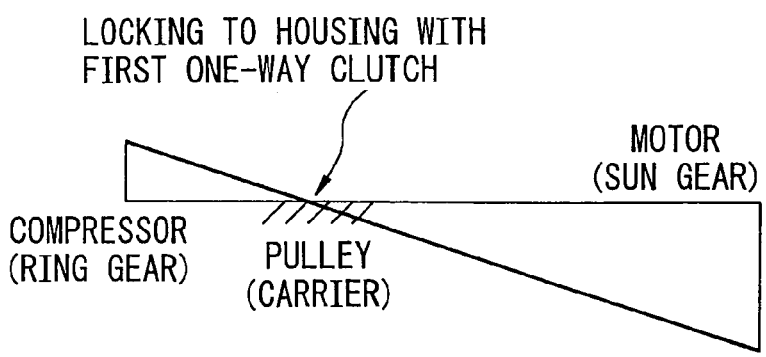
FIG. 4C is a graph showing a state of rotation operation in a motor driving mode.

FIG. 4C is a view showing a motor driving mode. In this motor driving mode, as described before, the ring gear 15 is rotatably driven via the rotation of the planetary gears 13 by driving the motor 20 (the sun gear 11) in the reverse direction under the condition that the electromagnetic clutch 50 is turned off, that is, the electromagnetic clutch 50 is disconnected. At this time, the ring gear 15 is rotatably driven in the direction (the direction 15B) in which the second one-way clutch 30 does not inhibit the rotation, so that the compression section 2 can be operated. At this time, the revolution of the planetary gear 13 in the reverse direction (the direction 11B) is inhibited by the first one-way clutch 40.

Next, the functions and the effects of the above embodiment will be explained as follows.

It is possible to provide the following effects using the hybrid compressor of the above embodiment of the present invention.

It is unnecessary to provide a starter motor exclusively used for restarting the engine after the completion of idling stop, in a vehicle. Alternatively, the frequency of using the starter motor, which is exclusively used for restarting the engine, can be reduced.

As the engine can be driven via the belt, noise generated by the auxiliary machine can be reduced.

When the compressor is driven by the belt, even if the engine speed is changed, the compressor speed can be arbitrarily controlled.

Even when the vehicle is running, the compressor can be driven by the motor.

The compressor capacity can be made variable by controlling the motor speed.

It is possible to downsize the motor by employing a control unit to disconnect the electromagnetic clutch when the engine speed has increased to a high level not less than a predetermined speed. For example, in the case where the cooling load is low, it is necessary to drive the compressor at a low rotary speed. At this time, if it is possible for the motor to rotate at a high speed as shown in FIG. 5A, even when the electromagnetic clutch is turned on, the compressor speed can be controlled. However, in the case where the engine speed is high when the vehicle is running at high speed, it is necessary to raise the motor speed. However, the size of a motor, the speed of which can be increased high, is increased. Therefore, by employing a control unit which can disconnect the electromagnetic clutch when the engine speed is raised to a high level not less than a predetermined speed, the motor can be downsized when the electromagnetic clutch is turned off and the compressor is driven by the motor as shown in FIG. 5B.

The present invention can be also applied to an auxiliary machine such as a commonly used pump or a hydraulic pump, except for a hybrid compressor.

The present invention may be applied to a purpose except for an air conditioner.

It should be noted that the above embodiment is only an example of the present invention. The present invention is not limited to the above embodiment. The present invention is defined only by the subjects described in the claims of the present invention. Variations except for the above embodiment may be made by those skilled in the art.

While the invention has been described by reference to specific embodiments chosen for the purposes of illustration, it should be apparent that numerous modifications could be made thereto, by those skilled in the art, without departing from the basic concept and scope of the invention.

The invention claimed is:

1. An auxiliary machine driven by an engine comprising:
    a housing;
    an operating section operated by a rotary motion and having a drive shaft;
    an input shaft, one side of which is connected to the engine and the other side of which is connected to the operating section;
    a clutch for connecting the engine to the input shaft and for disconnecting the engine from the input shaft;
    an electric motor;
    a planetary gear mechanism;
    a first rotary direction regulating means for inhibiting a rotary direction of the input shaft in one-direction; and
    a second rotary direction regulating means for inhibiting a rotary direction of the drive shaft.

2. An auxiliary machine according to claim 1, wherein both the first rotary direction regulating means and the second rotary direction regulating means are respectively composed of a one-way clutch.

3. An auxiliary machine according to claim 1, wherein the planetary gear mechanism is arranged between the input shaft and the operating section, a sun gear of the planetary gear mechanism is connected to the electric motor, a ring gear of the planetary gear mechanism is connected to the operating section, and planetary gears of the planetary gear mechanism are connected to the input shaft.

4. An auxiliary machine according to claim 1, wherein the auxiliary machine is a compressor used for an air conditioner for vehicle use.

5. An auxiliary machine according to claim 1, wherein the electric motor is capable of rotatably driving the engine via the input shaft and also capable of driving the operating section via the drive shaft.

6. An auxiliary machine according to claim 1, wherein the first rotary direction regulating means is arranged between the input shaft and the housing, and the second rotary direction regulating means is arranged between the drive shaft and the housing.

* * * * *